(12) United States Patent
Chang

(10) Patent No.: US 7,738,270 B2
(45) Date of Patent: Jun. 15, 2010

(54) POWER SUPPLY DEVICE

(75) Inventor: Kwo-Wei Chang, Hsinchu County (TW)

(73) Assignee: Princeton Technology Corporation, Taipei County (TW)

( * ) Notice: Subject to any disclaimer, the term of this patent is extended or adjusted under 35 U.S.C. 154(b) by 145 days.

(21) Appl. No.: 12/102,513

(22) Filed: Apr. 14, 2008

(65) Prior Publication Data
US 2009/0154208 A1 Jun. 18, 2009

(30) Foreign Application Priority Data
Dec. 13, 2007 (TW) ................ 96221184 U

(51) Int. Cl.
*H02M 1/12* (2006.01)
(52) U.S. Cl. .................... 363/44; 363/126
(58) Field of Classification Search ............ 363/44, 363/126, 125, 48, 47; 323/208; 713/300
See application file for complete search history.

(56) References Cited

U.S. PATENT DOCUMENTS

| | | | | |
|---|---|---|---|---|
| 4,222,096 A | * | 9/1980 | Capewell | 363/44 |
| 4,369,490 A | * | 1/1983 | Blum | 363/48 |
| 4,672,522 A | * | 6/1987 | Lesea | 363/48 |
| 4,930,061 A | * | 5/1990 | Slack et al. | 363/44 |
| 5,148,360 A | * | 9/1992 | Nguyen | 363/48 |
| 5,416,687 A | * | 5/1995 | Beasley | 363/44 |
| 5,960,207 A | * | 9/1999 | Brown | 713/300 |
| 6,594,165 B2 | * | 7/2003 | Duerbaum et al. | 363/125 |
| 7,026,767 B2 | * | 4/2006 | Yang | 315/171 |

\* cited by examiner

*Primary Examiner*—Shawn Riley
(74) *Attorney, Agent, or Firm*—Muncy, Geissler, Olds & Lowe, PLLC

(57) ABSTRACT

A power supply device with power conversion capabilities is disclosed. The power supply device comprises an input module, a power converter, and an output module. The input module is used for receiving an alternating current power. The power converter is coupled to the input module for converting the alternating current power to a direct current power. The output module is coupled to the power converter for outputting the direct current power.

12 Claims, 5 Drawing Sheets

POWER SUPPLY DEVICE

BACKGROUND OF THE INVENTION

1. Field of the Invention

The invention relates to a power supply device, and more particularly to a power supply device with a power converter for providing power to a notebook computer.

2. Description of the Related Art

With the rapid development of information technology, a notebook computer was created for a computer user to be operated anywhere. Due to the advantages of portability and convenience, the notebook computer has become a popular product.

However, huge power consumption of the notebook computer is one of the most significant problems which need to be improved. Please refer to FIG. 1. FIG. 1 illustrates a diagram of a common notebook computer connected to a utility power via a transformer. As shown in FIG. 1, a notebook computer 10 generally has an installed battery. A transformer 20 with a plug 202 and a cable plug 204 connects to the battery of the notebook computer 10 and supplies power to the notebook computer 10 by converting the utility power received via the socket coupled to the plug 202 of the transformer 20. Consequently, the utility power is supplied to the battery through the cable plug 204 for charging or to the notebook computer 10 directly for normal operation of the notebook computer 10.

Before activities are planned with the notebook computer 10, a user must ensure sufficient electrical power of the notebook computer 10 when mobile, either by fully charging the battery according to the above-described charging mechanism, or by manually carrying the transformer 20. Therefore, assuring operation of the notebook computer 10 when the installed battery runs out of power. However, the transformer 20 of the common notebook computer 10 is usually a certain weight, and thus a burden and significant inconvenience for users to carry around.

Therefore, it has become a main subject to develop and provide a more convenient way for a user to operate a notebook computer normally without manually carrying around a transformer.

BRIEF SUMMARY OF THE INVENTION

Accordingly, it is an object of the invention to provide a power supply device with power conversion capabilities for supplying power required by a notebook computer, which mitigates the conventional problems previously mentioned.

In one embodiment of the invention, a power supply device with power conversion capabilities is provided. The power supply device comprises an input module, a power converting module, and an output module. The input module is provided for receiving an alternating current power. The power converting module is coupled to the input module for converting the alternating current power to a direct current power. The output module is coupled to the power converting module for outputting the direct current power. Further, the power supply device is installed on a wall.

A detailed description is given in the following with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
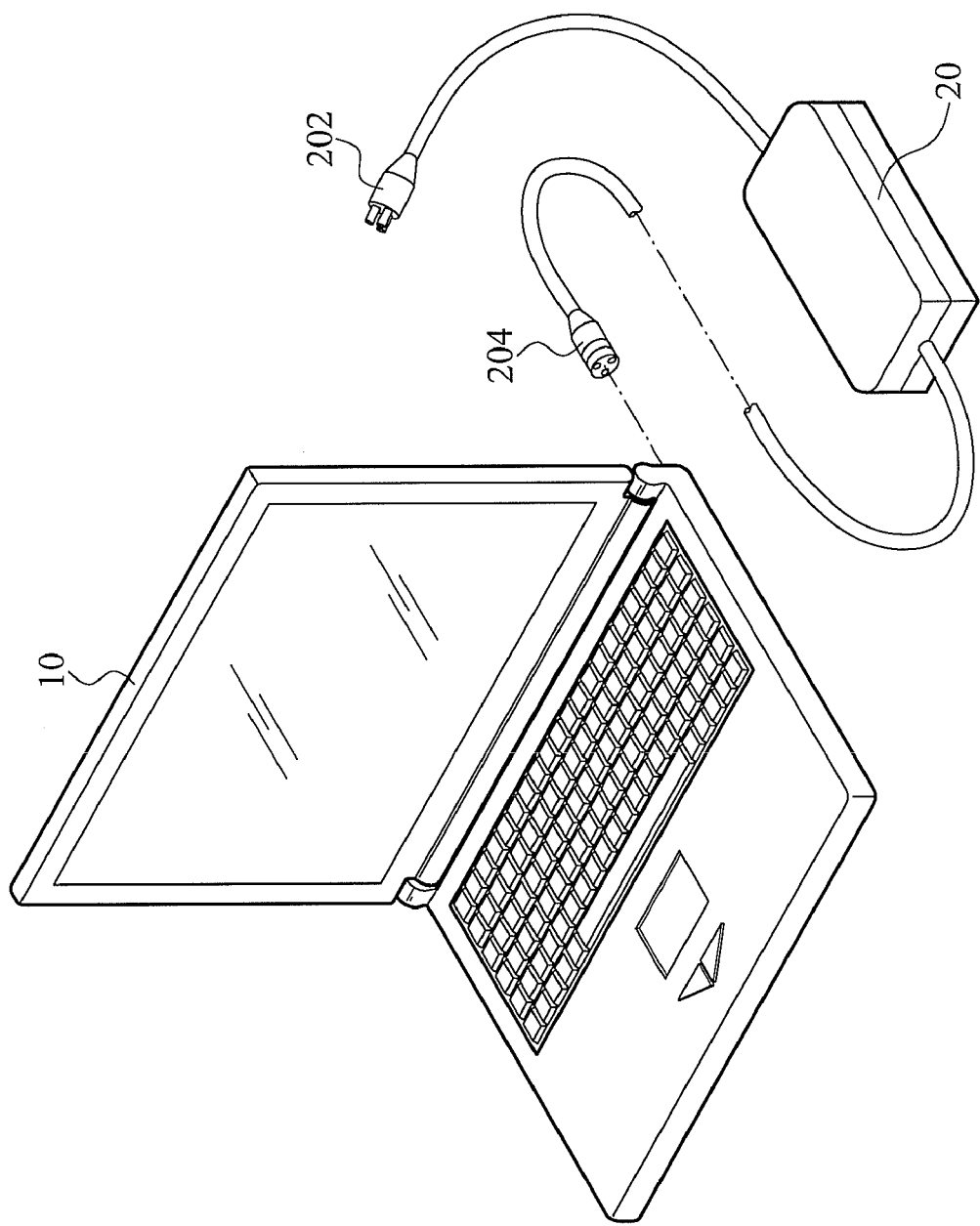
FIG. 1 illustrates a diagram of a common notebook computer connected to a utility power via a transformer.
Figure 2:
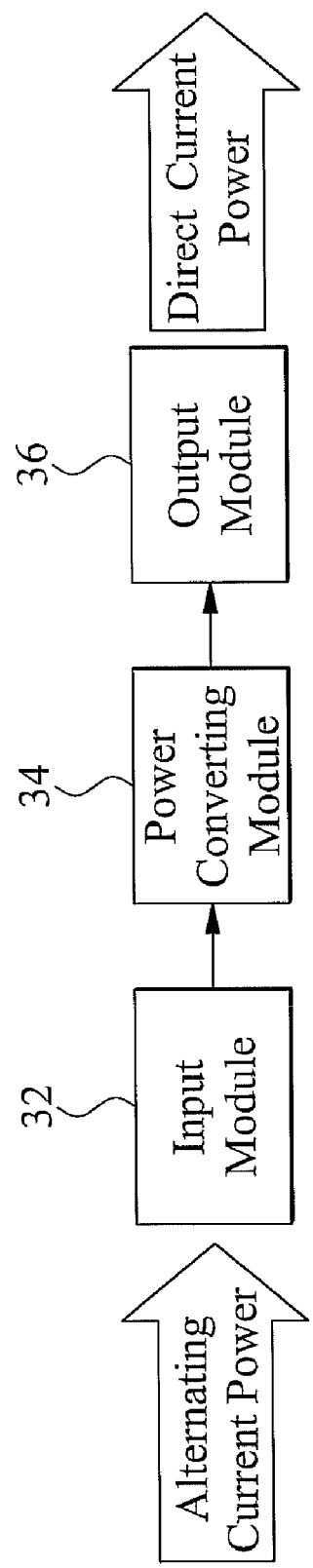
FIG. 2 illustrates a block diagram of a power supply device according to an embodiment of the invention.

Please refer to FIG. 2. FIG. 2 illustrates a block diagram of a power supply device according to an embodiment of the invention. As shown in FIG. 2, according to the embodiment of the invention, the power supply device 30 comprises an input module 32, a power converting module 34, and an output module 36. The input module 32 is provided for receiving an alternating current power. The power converting module 34 is coupled to the input module 32 for converting the alternating current power to a direct current power. The output module 36 is coupled to the power converting module 34 for outputting the direct current power, wherein the direct current power is provided for a portable electronic device, such as a notebook computer, a mobile phone, a personal digital assistant (PDA), a portable media player (PMP) and so forth. In addition, the power supply device 30 is installed on a wall.

According to an embodiment of the invention, the input module 32 is a power plug coupled to a domestic power socket for receiving a domestic alternating current power. Additionally, the output module 36 is a socket coupled to a portable electronic device via a cable for providing the direct current power to the portable electronic device. Moreover, the output module 36 is also a plug coupled to a portable electronic device for providing the direct current power to the portable electronic device.

Further, the output module 36 of the invention also supplies the direct current power via the transmission of a universal serial bus (USB). According to an embodiment of the invention, the output module 36 is a universal serial bus socket correspondingly coupled to a universal serial bus plug of a portable electronic device so as to supply the direct current power to the portable electronic device via the transmission of the universal serial bus. According to another embodiment of the invention, the output module 36 is a universal serial bus plug. When a portable electronic device comprises a universal serial bus socket, the portable electronic device is able to obtain the direct current power via the universal serial bus socket coupled to the universal serial bus plug. According to the aforementioned embodiments, the output module 36 may also be coupled to a portable electronic device via, for example but not limited to, a cable for the user. Any mechanisms supplying a direct current power to a portable electronic device by usage of a plug or a socket are covered in the exemplary embodiments of the invention.

According to the aforementioned embodiments, the direct current power is able to be converted to the power mode required for usage by the portable electronic device. For example, the power supply device 30 of the invention converts a general utility power, a 110V alternating current power, to an 11V direct current power, or a 5V direct current power, and so on, in correspondence with the direct current power specification of a portable electronic device and provides power to the portable electronic device for usage. According to the power supply device 30 of the invention, the user with a portable electronic device requiring power conversion is not required to manually carry around a heavy power transformer. Moreover, the power supply device 30 of the invention significantly improves user convenience as the power supply device 30 may be installed on a wall.

Figure 3:
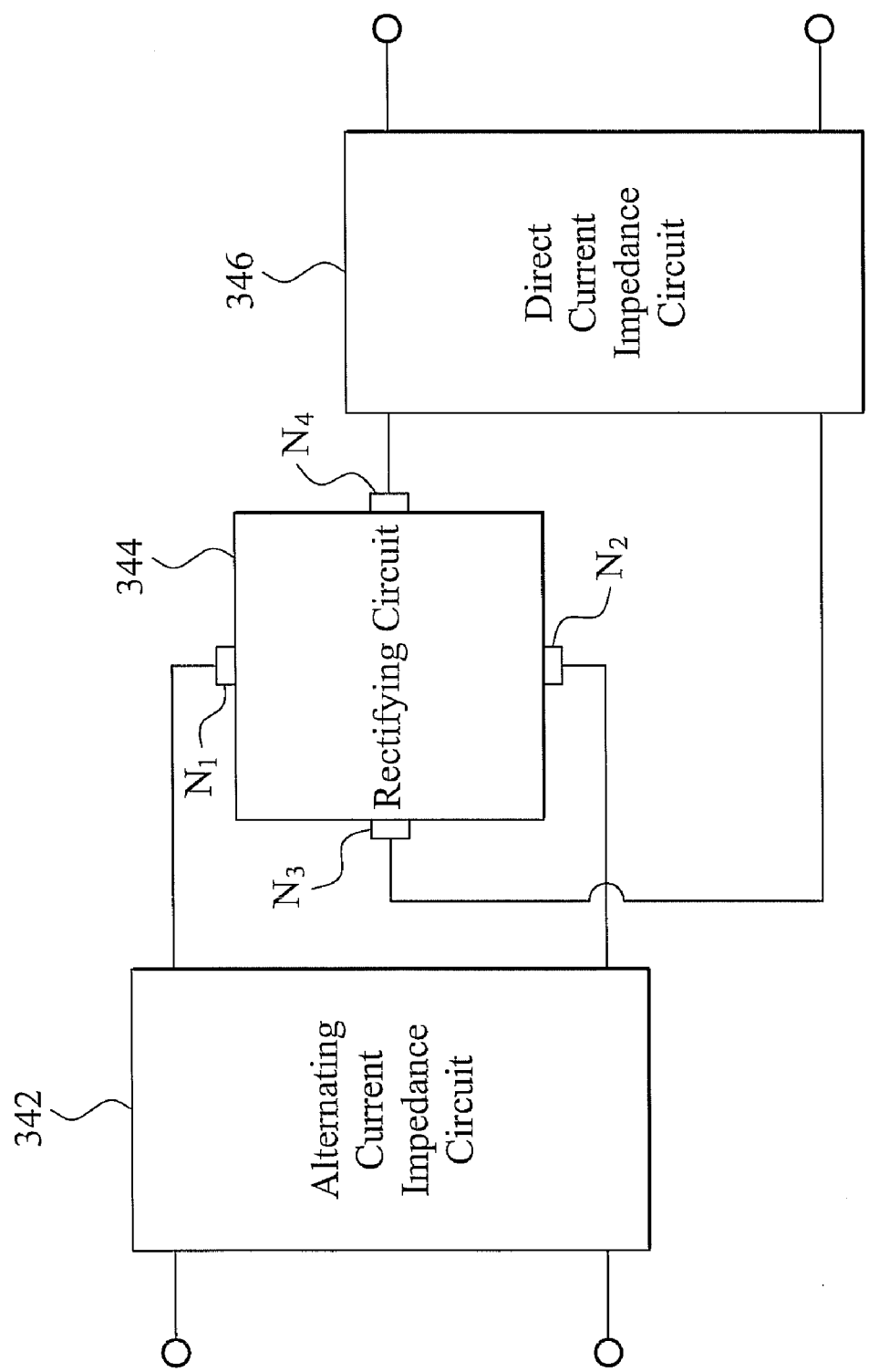
FIG. 3 illustrates a block diagram of a power converting module of a power supply device according to an embodiment of the invention.

Please refer to FIG. 3. FIG. 3 illustrates a block diagram of a power converting module of a power supply device according to an embodiment of the invention. As shown in FIG. 3, the power converting module 34 comprises an alternating current impedance circuit 342, a rectifying circuit 344, and a direct current impedance circuit 346. The alternating current impedance circuit 342 is provided for choking an alternating current power. The rectifying circuit 344 is coupled to the direct current impedance circuit 346. The rectifying circuit 344 comprises two alternating current input nodes N1 and N2 and two direct current output nodes N3 and N4, wherein the two alternating current input nodes N1 and N2 are coupled to the alternating current impedance circuit 342. The rectifying circuit 344 is provided for converting the alternating current power to a direct current power. The direct current impedance circuit 346 is coupled to the two direct current output nodes N3 and N4 of the rectifying circuit 344 for outputting a stable direct current power. Accordingly, when the alternating current power voltage unexpectedly fluctuates (raises or drops), the power converting module 34 will still provide a stable direct current power to the output module 36.

Figure 4:
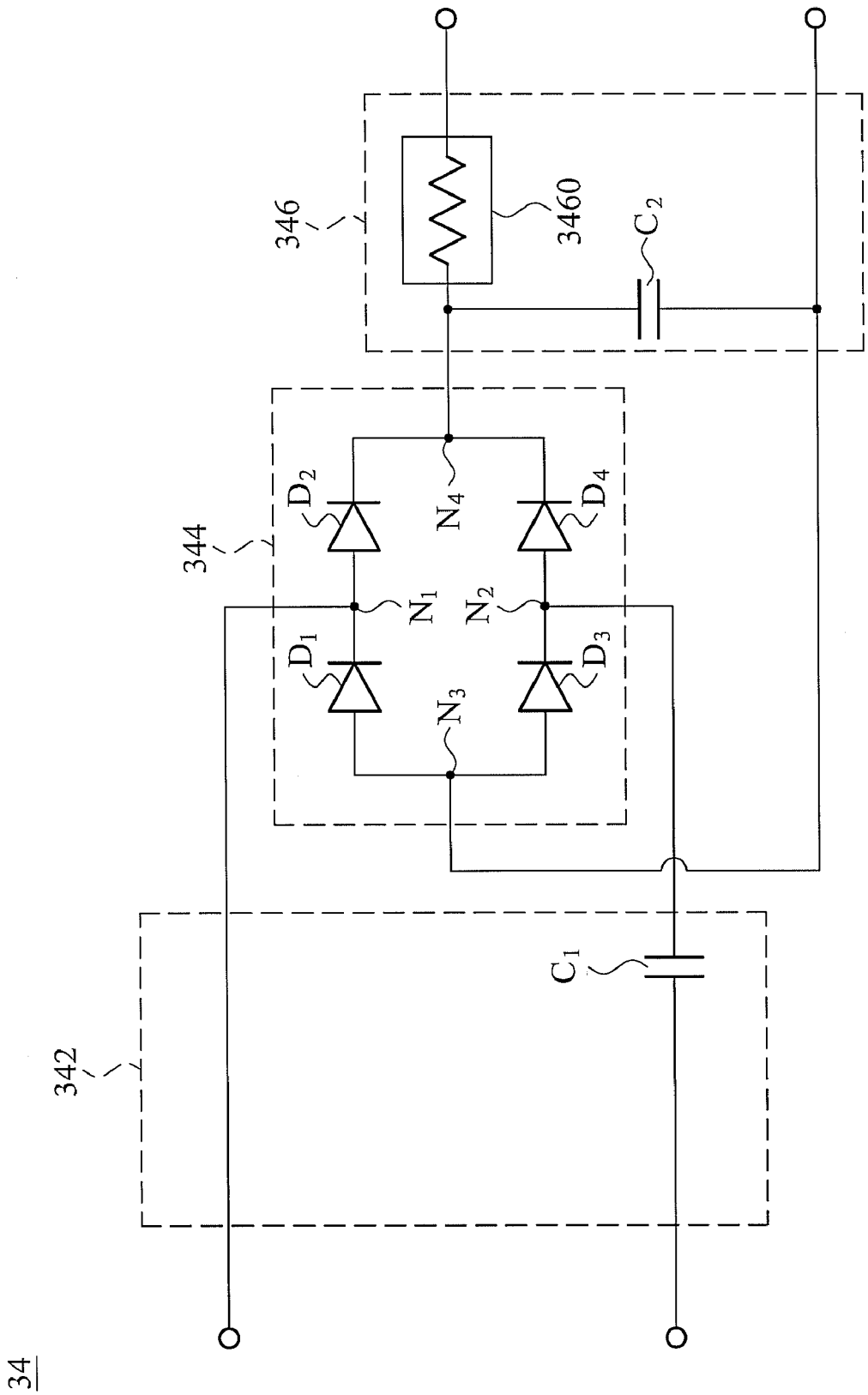
FIG. 4 illustrates a circuit diagram of a power converting module of a power supply device according to an embodiment of the invention.

Please refer to FIG. 2 and FIG. 4. FIG. 4 illustrates a circuit diagram of a power converting module of a power supply device according to an embodiment of the invention. According to the embodiment of the invention, the alternating current impedance circuit 342 is an impedance circuit comprising a capacitor C1 as shown in FIG. 2 and FIG. 4. One node of the capacitor C1 is coupled to an alternating current input node N2 of the rectifying circuit 344, and the other node of the capacitor C1 is coupled to the input module 32.

Figure 5:
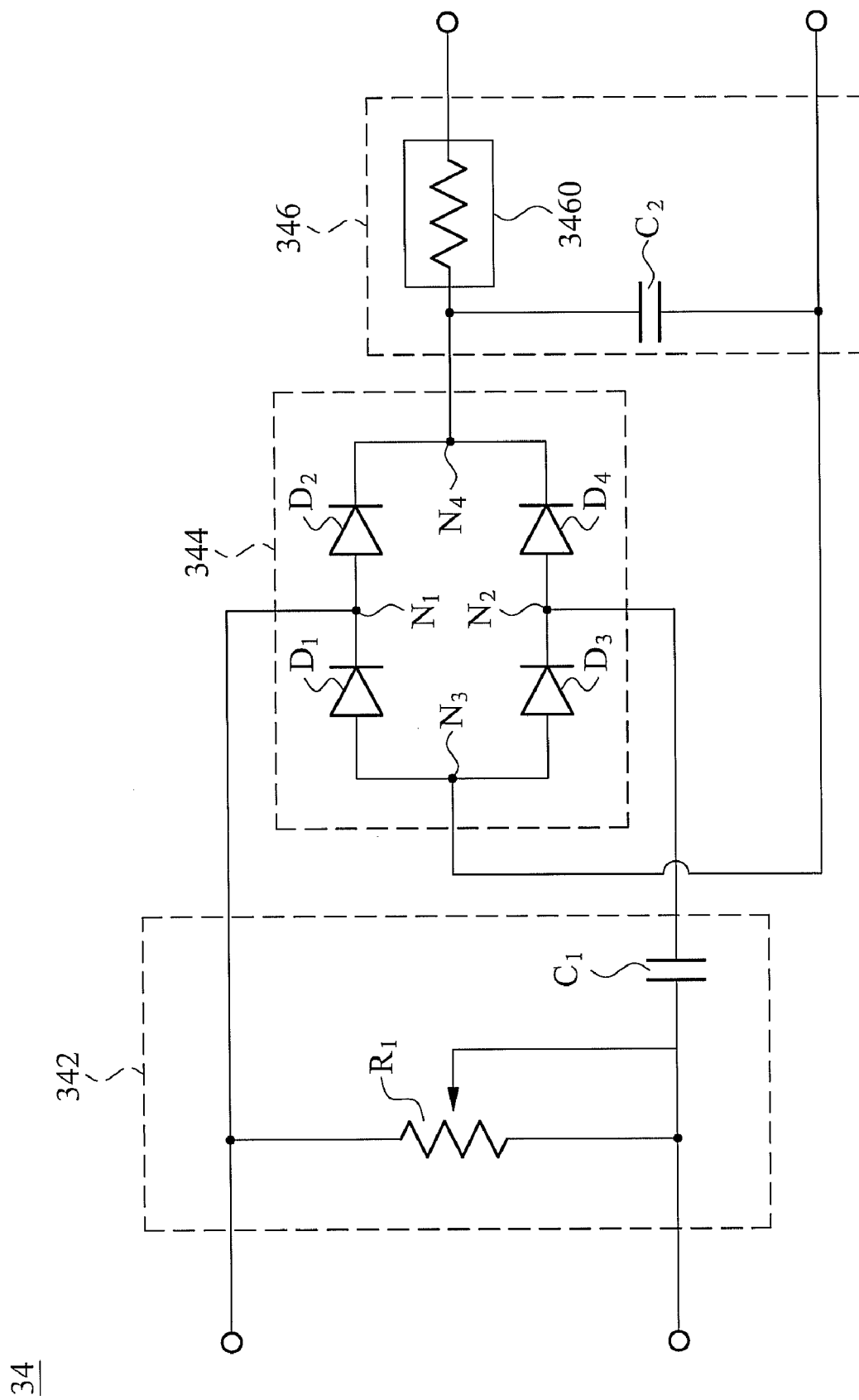
FIG. 5 illustrates a circuit diagram of a power converting module of a power supply device according to another embodiment of the invention.

Please refer to FIG. 2 and FIG. 5. FIG. 5 illustrates a circuit diagram of a power converting module of a power supply device according to another embodiment of the invention. According to the embodiment of the invention, the alternating current impedance circuit 342 is an impedance circuit comprising a variable resistor R1 and a capacitor C1 as shown in FIG. 2 and FIG. 5. The variable resistor R1 is coupled in parallel to the two alternating current input nodes N1 and N2 of the rectifying circuit 344. One node of the capacitor C1 is coupled to an alternating current input node N2 of the rectifying circuit 344 and the other node of the capacitor C1 is coupled to the variable resistor R1. In addition, the power supply device 30 further comprises an adjusting device (not shown) coupled to the power converting module 34, wherein the adjusting module (not shown) is provided for adjusting the value of the variable resistor R1. The direct current power from the rectifying circuit 344 is accordingly adjusted by changing the value of the variable resistor R1.

Furthermore, the rectifying circuit 344 is a bridge rectifying circuit. The bridge rectifying circuit is composed of 4 diodes, wherein a first diode D1 and a second diode D2 are coupled in series, and a third diode D3 and a fourth diode D4 are coupled in series. In addition, N-type electrodes of the first diode D1 and the third diode D3 are coupled to the direct current impedance circuit 346. P-type electrodes of the first diode D1 and the third diode D3 as well as N-type electrodes of the second diode D2 and the fourth diode D4 are coupled to the direct current impedance circuit 346. The rectifying circuit 344 effectively converts an alternating current power to a direct current power by configuration of the aforementioned circuits.

The direct current impedance circuit 346 is composed of an impedance circuit 3460 and a capacitor C2, wherein the capacitor C2 is coupled in parallel to the two direct current output nodes N3 and N4 of the rectifying circuit 344. One node of the impedance circuit 3460 is coupled to the direct current output node N4 of the rectifying circuit 344, and the other node of the impedance circuit 3460 is coupled to the output module 36. The impedance circuit 3460 is a circuit comprising a resistor, a capacitor, or an inductor. For example, the impedance circuit 3460 is a resistor. Additionally, a direct current impedance circuit 346 may comprise the impedance circuit 3460, without a capacitor.

The power converting module 34 converts an alternating current power supplied from the input module 32 to a direct current power. The direct current power is then transmitted from the direct current impedance circuit 346 to the output module 36. Accordingly, when an alternating current power voltage from the input module 32 unexpectedly fluctuates (rises or drops), the power converting module 34 will still provide a stable direct current power to a portable electronic device coupled to the output module 36 and prevent the portable electronic device from damage.

The power supply device of the invention is provided for installing a conventional notebook computer transformer to a socket on the wall. When a user operates a notebook computer, the power of the notebook computer is obtained by plugging a cable to the output module of the power supply device of the invention. When the user is on a business trip, the inconvenience of carrying a transformer is overcome, for example, in a hotel room provided with the power supply device of the invention. Furthermore, convenience of using a notebook computer is significantly improved.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power supply device with power conversion capabilities, comprising:

an input module for receiving an alternating current power;

a power converting module coupled to the input module for converting the alternating current power to a direct current power, wherein the alternating current power is received from a first output node and a second output node of the input module; and an output module coupled to the power converting module for outputting the direct current power, wherein the power converting module further comprises:

an alternating current impedance circuit composed of a variable resistor and a capacitor, wherein the capacitor has a first node coupled to the second output node of the input module for choking the alternating current power;

a rectifying circuit coupled to the alternating current impedance circuit having two alternating current input nodes and two direct current output nodes for converting the alternating current power to a direct current power, wherein a first alternating current input node is coupled to the first output node of the input module, a second alternating current input node is coupled to a second node of the capacitor and the variable resistor is coupled in parallel to the two alternating current input nodes of the rectifying circuit; and a direct current impedance circuit coupled to the two direct current input nodes of the rectifying circuit for outputting the direct current power.

2. The power supply device as claimed in claim 1, wherein the power supply device is installed on a wall.

3. The power supply device as claimed in claim 2, wherein the input module is an electrical plug coupled to a domestic power supply apparatus for receiving a domestic alternating current power.

4. The power supply device as claimed in claim 3, wherein the output module is a socket coupled to a portable electronic device for supplying the direct current power to the portable electronic device.

5. The power supply device as claimed in claim 3, wherein the output module is a plug coupled to a portable electronic device for supplying the direct current power to the portable electronic device.

6. The power supply device as claimed in claim 3, wherein the output module is a universal serial bus socket coupled to a universal serial bus plug of a portable electronic device for supplying the direct current power to the portable electronic device.

7. The power supply device as claimed in claim 3, wherein the output module is a universal serial bus plug coupled to a universal serial bus socket of a portable electronic device for supplying the direct current power to the portable electronic device.

8. The power supply device as claimed in claim 1, further comprising an adjusting device coupled to the power converting module for adjusting the value of the variable resistor so as to adjust the value of the direct current power.

9. The power supply device as claimed in claim 1, wherein the rectifying circuit is a bridge rectifying circuit.

10. The power supply device as claimed in claim 9, wherein the bridge rectifying circuit is composed of four diodes.

11. The power supply device as claimed in claim 1, wherein the direct current impedance circuit is composed of an impedance circuit and a capacitor, wherein the capacitor is coupled in parallel to the two direct current output nodes of the rectifying circuit, one node of the impedance circuit is coupled to one of the direct current output nodes of the rectifying circuit, and the other node of the impedance circuit is coupled to the output module.

12. The power supply device as claimed in claim 1, wherein the direct current power of the output module is provided for a portable electronic device.

* * * * *